United States Patent
Cheng et al.

(10) Patent No.: US 9,600,529 B2
(45) Date of Patent: Mar. 21, 2017

(54) ATTRIBUTE-BASED DOCUMENT SEARCHING

(71) Applicant: Wal-Mart Stores, Inc., Bentonville, AR (US)

(72) Inventors: Jinxing Cheng, Palo Alto, CA (US); Abhishek Gattani, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 156 days.

(21) Appl. No.: 13/828,331

(22) Filed: Mar. 14, 2013

(65) Prior Publication Data

US 2014/0280082 A1 Sep. 18, 2014

(51) Int. Cl.
*G06F 17/30* (2006.01)

(52) U.S. Cl.
CPC .... *G06F 17/3053* (2013.01); *G06F 17/30401* (2013.01); *G06F 17/30864* (2013.01)

(58) Field of Classification Search
CPC .............. G06F 17/30; G06F 17/30864; G06F 17/30616; G06F 17/30011; G06F 17/30598; G06F 17/30613; G06F 17/30705; G06F 17/3071; G06F 17/30722; G06F 17/30867; Y10S 707/99933; Y10S 707/99932; Y10S 707/99931; Y10S 707/99936
USPC ....... 707/723, 728, 741, 715, 736, 738, 740, 707/749, 750, 755; 704/9; 706/12
See application file for complete search history.

(56) References Cited

U.S. PATENT DOCUMENTS

| | | | | |
|---|---|---|---|---|
| 6,128,634 A * | 10/2000 | Golovchinsky | ....... | G06F 17/277 707/999.003 |
| 7,657,506 B2 * | 2/2010 | Levin | ................ | G06F 17/30598 707/999.002 |
| 7,725,424 B1 * | 5/2010 | Ponte | ................ | G06F 17/30867 707/715 |
| 7,814,107 B1 * | 10/2010 | Thirumalai | ....... | G06F 17/30011 707/749 |
| 7,925,498 B1 * | 4/2011 | Baker | ................ | G06F 17/30672 704/10 |
| 8,635,212 B1 * | 1/2014 | Bunn | ................ | G06F 17/30867 707/706 |
| 2005/0210006 A1 * | 9/2005 | Robertson et al. | ................ | 707/3 |
| 2005/0234880 A1 * | 10/2005 | Zeng | ................ | G06F 17/30616 |
| 2006/0106767 A1 * | 5/2006 | Adcock | ............... | G06F 17/2785 |
| 2009/0138473 A1 * | 5/2009 | Manabe et al. | ................... | 707/7 |

(Continued)

*Primary Examiner* — Dennis Truong
(74) *Attorney, Agent, or Firm* — Bryan Cave LLP (57) ABSTRACT

Systems and methods are disclosed herein for providing search results, particularly product records from a product database. Tokens of a query are identified. Product records including one or more tokens in values associated with the attributes thereof are identified. A score is generated for attributes of products including a token (an attribute-token score). The attribute-token score is based on a frequency of occurrence of the token in the attribute value and a length of the attribute value in which it occurs. The attribute-token scores for the token are summed to generated a score. The token score for a token may be scaled in a non-linear fashion such that the scaled value approaches a saturation value, which may be an inverse document frequency (IDF) score for the token. The scaled values may then be summed to generate a score for the document that is used to rank the search results.

22 Claims, 4 Drawing Sheets

(56) References Cited

U.S. PATENT DOCUMENTS

| | | | |
|---|---|---|---|
| 2009/0171929 A1* | 7/2009 | Jing | G06F 17/3064 |
| 2010/0070506 A1* | 3/2010 | Whang | G06F 17/30678 |
| | | | 707/740 |
| 2010/0169317 A1* | 7/2010 | Wang | G06F 17/277 |
| | | | 707/736 |
| 2011/0087668 A1* | 4/2011 | Thomas | G06F 17/30705 |
| | | | 707/738 |
| 2011/0314005 A1* | 12/2011 | Guo | G06F 17/30616 |
| | | | 707/723 |
| 2013/0110828 A1* | 5/2013 | Meyerzon et al. | 707/728 |
| 2013/0268519 A1* | 10/2013 | Cucerzan et al. | 707/723 |
| 2013/0282361 A1* | 10/2013 | Hartl et al. | 704/9 |
| 2013/0325881 A1* | 12/2013 | Deshpande | G06F 17/30292 |
| | | | 707/755 |

\* cited by examiner

ATTRIBUTE-BASED DOCUMENT SEARCHING

FIELD OF THE INVENTION

This invention relates to systems and methods for responding to search queries, and, more particularly, to searches for products in a product database.

BACKGROUND OF THE INVENTION

It is the goal of many online retailers to be a one-stop-shop for customers. Accordingly, the retailer may have a very large array of products. In order to better meet the needs of customers, many retailers also integrate products of other merchants into their websites, further increasing the number of products available. With so many products offered for sale, it can be difficult for a customer to find a desired product through a search. Many retailers offer free-form text searches of their product databases. However, the large number of products available provides many opportunities for matching but irrelevant products.

Accordingly, it would be an advancement in the art to provide an improved approach to performing product-based searches that increases the relevance of search results to a user.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
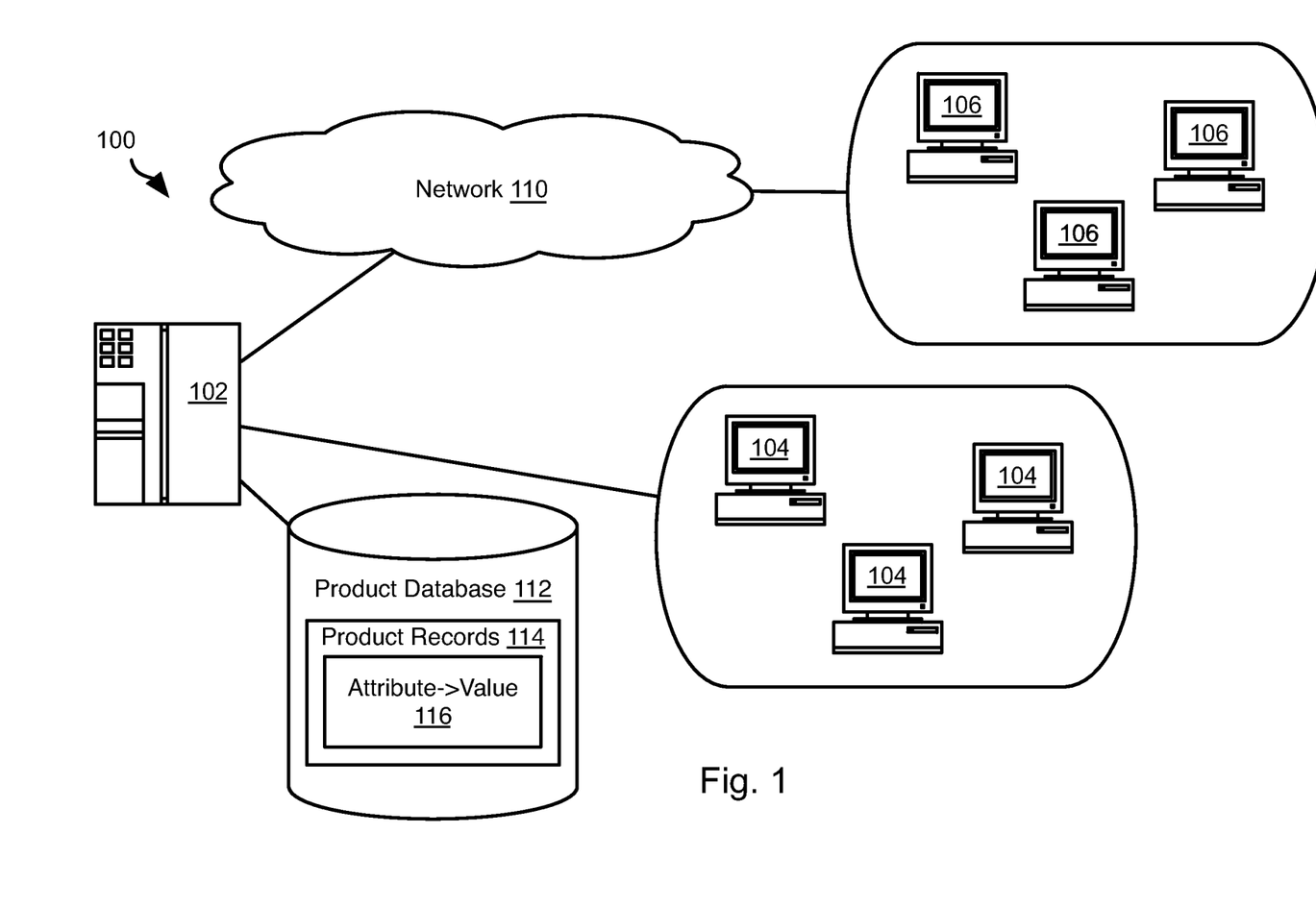
FIG. 1 is a schematic block diagram of a system for performing methods in accordance with embodiments of the present invention.

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more merchant workstations 104 and one or more customer workstations 106. In the methods disclosed herein, the merchant workstations 104 and customer workstations 106 may be embodied as mobile devices such as desktop computers or other computing device such as a mobile phone or tablet computer.

In some embodiments, some or all of the methods disclosed herein may be performed using a desktop computer or any other computing device as the merchant workstations 104 and customer workstations 106. For purposes of this disclosure, discussion of communication with a user or entity or activity performed by the user or entity (e.g. analyst, crowdsourcing community, merchant) may be interpreted as communication with a computer 104, 106 associated with the user or entity or activity taking place on a computer associated with the user or entity. The merchant workstations 104 may be viewed as a merchant computer network 104 whereby tasks to be performed by a merchant representative may be performed by any member of the population by means of logic implemented by the computer network, the server system 102, or some other entity.

Some or all of the server 102, merchant computers 104, and customer workstations may communicate with one another by means of a network 110. The network 110 may be embodied as a peer-to-peer connection between devices, a connection through a local area network (LAN), WiFi network, the Internet, or any other communication medium or system. Each of the populations 104, 106 of workstations may be coupled to one another by separate networks some or all of the three populations 104, 106 of workstations may share a common network. For example, in the illustrated embodiments, the merchant workstations and server system 102 may communicate over a separate private network, rather than over the network 110.

The server system 102 may be associated with a merchant, or other entity, providing search services. For example, the server system 102 may host a search engine or a site hosted by a merchant to provide access to information about products and user opinions about products. For example, the server system may host or access a product database 112 storing a plurality of product records 114. The product records 114 may include a plurality of attribute-value pairs 116. An attribute-value pair may be of the form [attribute]→[value], where [attribute] is an attribute such as a color, size, functionality, intended use, brand, model name, retailer, price, point of origin, or any other attribute defining a product the terms of sale of a product. The [value] field is a data structure defining the actual value for the attribute for the product. In some embodiments, the product database is a unified database where each product that has a common attribute will have a corresponding identical attribute field, e.g. represented using the same textual or other descriptor. The values that may be assigned to the attribute may also be standardized such that where two products have the same attribute value, that value will be represented in the same way. In other embodiments, the product database is not completely unified such that some attributes and corresponding values may be represented differently even when identical in fact.

Figure 2:
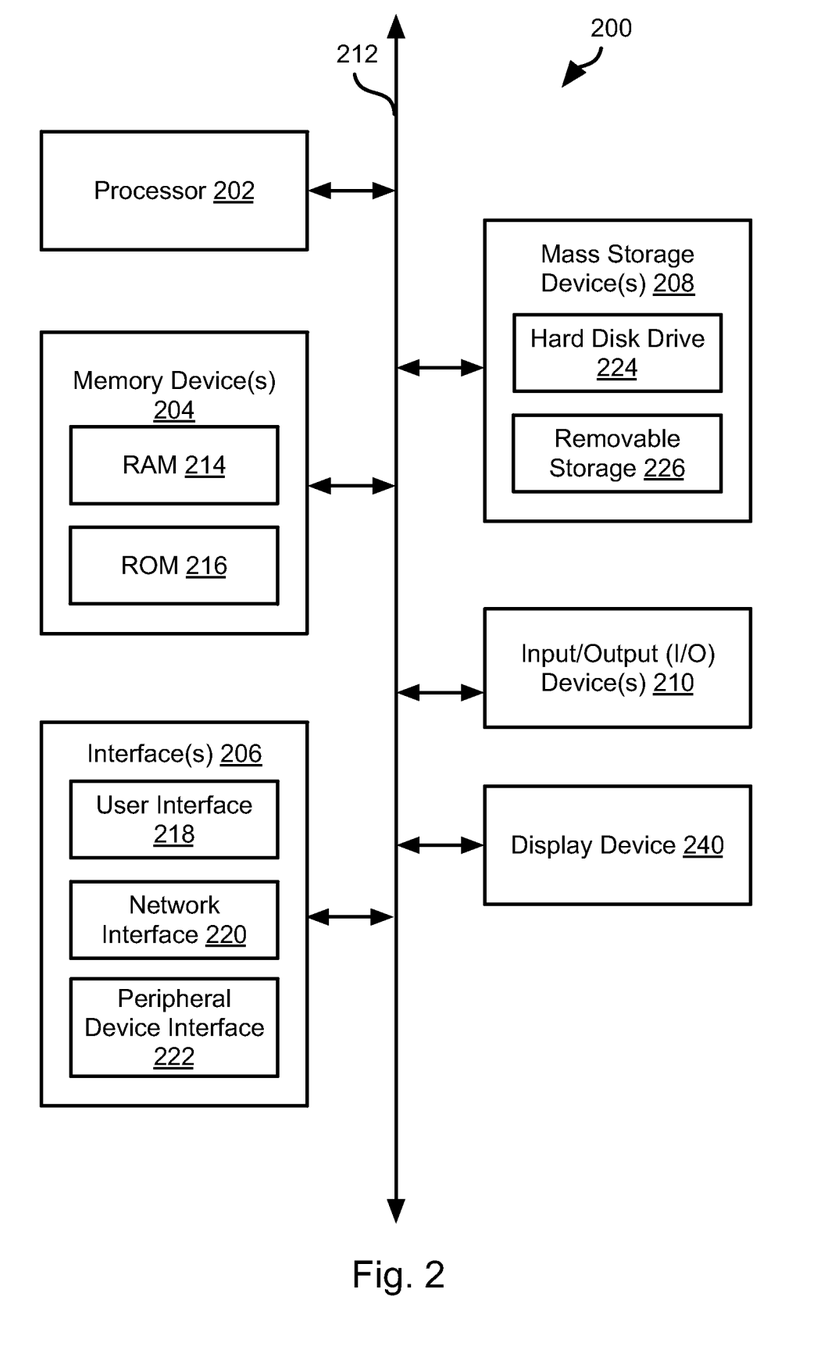
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, merchant workstation 104, and customer workstation 106, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more non-transitory mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
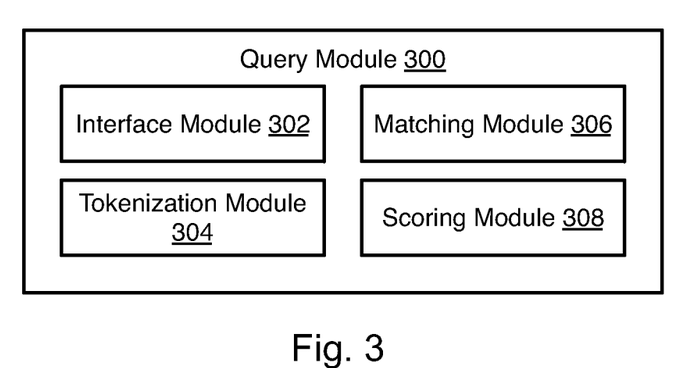
FIG. 3 is a schematic block diagram of modules implementing methods in accordance with embodiments of the present invention.

FIG. 3 illustrates a query module 300 including software and/or hardware modules implementing classification methods disclosed herein. In some embodiments, the modules and data of the query module 300 are implemented or accessed by the server system 102 or some other entity that provides an interface to the server system 102.

The query module 300 may include an interface module 302 for receiving queries and transmitting responses to queries to a requesting entity. The query module 300 may be part of a data flow such that a query input to the query module 300 is not received directly from, for example, the customer workstation 106. For example, a query may be expanded or otherwise modified to include keywords associated with concepts identified in the query. The query may also be generated by some other software module executed by the server system 102. Whichever entity originated a query received by the interface module 302, the interface module 302 may route the search results to this requesting entity or to some other entity specified with the query.

The query module 300 may include a tokenization module 304. The tokenization module 304 identifies tokens in a received query. A token may be a word or phrase. In some embodiments, a word may be included in multiple tokens. For example a word may be extracted as a token individually and a multi-word phrase including the word may also be extracted as a token from the query. Tokens may be identified with reference to a dictionary using a greedy matching technique—a word will be included in a token that is the longest string in the query that matches a string in the dictionary. In other embodiments, a non-greedy matching technique may be used to identify tokens. In some embodiments, the tokenization module 304 may add other tokens that are not found in the query but are conceptually related to the words or phrases of the query.

A matching module 306 identifies product records 114 that include one or more tokens found in the query. In particular, the matching module 306 may identify product records 114 that include at least one token in at least one attribute-value pair 116 thereof. In some embodiments, less than an exact match may be required. For example, a singular token may be found to match a plural form thereof, or vice-versa. Likewise, a misspelled token may be found to match a correctly spelled version thereof. A string-edit distance or other textual similarity metric may also be used to match a token to a dissimilar word in a product record that nonetheless has a high degree of similarity according to the similarity metric.

The query module 300 may also include a scoring module 308 that assigns scores to product records identified by the matching module 306. The query module 300 may additionally perform ranking of the product records and a selection of a subset thereof based on the scores. Product records as scored, ranked, and/or selected may then be returned to a requesting entity by the interface module 302 or some other entity specified with the query. The algorithm by which the matching product records are scored will be described in greater detail hereinbelow.

Figure 4:
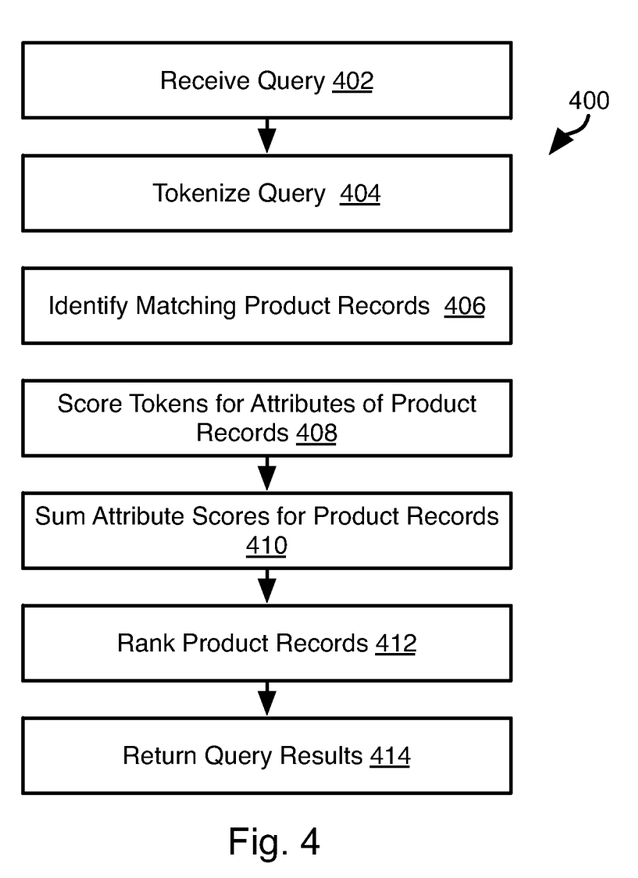
FIG. 4 is a process flow diagram of a method for responding to a query in accordance with an embodiment of the present invention.

Referring to FIG. 4, a method 400 may be executed to process queries in accordance with an embodiment of the invention. The method 400 may be executed by a server system 102 in response to a query received from a customer workstation 106. In particular, a customer workstation 106 may receive the query input to a merchant website transmitted to the customer workstation 106 by the server system 102 or some other web server and rendered by a browser on the customer workstation 106. For example, the website may be an ecommerce website enabling the searching and navigation of the merchant's products and conducting electronic transactions to purchase products. A query received through the website may then be transmitted by the customer workstation 106 to the server system 102, which receives 402 the query.

The received 402 query may then be tokenized 404, which may include generating a vector or array of tokens in the query. The method by which tokens are identified may be as described above with respect to the tokenization module 304. The product records 114 of the product database 112 may then be analyzed to identify 406 a plurality of product records 114 at least one of the tokens of the query. In some embodiments, only those product records 114 matching all or a threshold amount or percentage of the tokens are identified 406 as matching. As noted above, a product record 114 may be deemed to match a token where the value of an attribute-value pair 116 thereof includes at least one instance of the token.

The product records identified 406 may then be scored according to the novel algorithm disclosed herein. As one step of this scoring process, tokens found in an attribute of a product record may be scored according to properties of the attribute value in which the token was found. In particular, one or more instances of a token found in an attribute may be assigned a score that increases with the frequency of occurrence of the token and that decreases according to the length of the attribute value in which the one or more instances of the token were found. Stated differently, the one or more instances of a token found in an attribute value will be assigned a score based on the frequency of occurrence thereof. This score will be reduced by a penalty amount that increases based on a length of the attribute value in which the one or more instances of the token occur.

The method 400 may further include assigning a score to each product record based summing the scores assigned to the tokens found in the instanced thereof. For example, for each one or more instances of a token found in an attribute of the product record, the corresponding score, as calculated according to step 408, may be added to the score for that product record. In some embodiments, for each token, the scores calculated for the attributes in which the token occurred may first be summed, or weighted and summed, to calculated a token score. All token scores for tokens found in the document may then be summed to arrive at a final document score. In some embodiments, the token scores may be scaled, such as according to a non-linear scaling function. In particular, the non-linear scaling function may be such that the scaled token scores approach a saturation value as the value of the token scores increase.

The scores associated with the matching product records may then be ranked 412. Ranking 412 may include selecting a top N product records with the highest scores. The ranked product records may then be returned 414 to a requesting entity or to an entity specified with a query. The ranked product records may be transmitted with one or both of the score associated therewith and a ranking assigned thereto. In some embodiments, the order in which the ranked products are transmitted or written in a transmitted data structure is indicative of the rank thereof.

Figure 5:
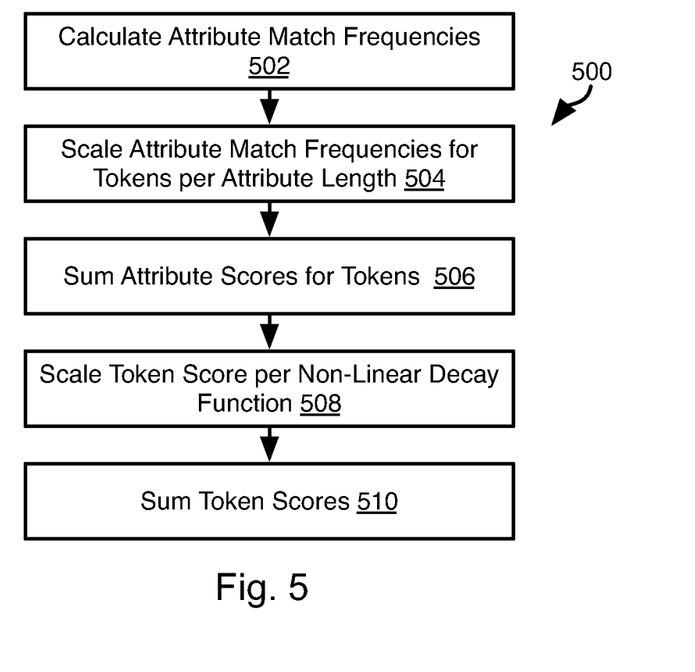
FIG. 5 is a process flow diagram of a method for scoring a document in accordance with an embodiment of the present invention.

FIG. 5 illustrates a more detailed method 500 by which a score may be assigned to a matching product record for use in ranking 412 a product record in accordance with the method 500. The method 500 may likewise be executed by a server system 102. The method 500 may include executing steps 502-506 for each token found in a product record. The method 500 may be executed for each product record having at least one matching token or a number of matching tokens meeting some threshold criteria.

Accordingly, for a matching token, the frequencies within which the token appears in each attribute of the product record may be calculated 502. Where no instances of the token are found in an attribute value of the product record the frequency would be zero. These frequencies may then be scaled 504 based on the length of the attribute value in which the token occurred.

For example, a particular product record d for which the method 500 is executed may have a plurality of attribute values c. A matching token t may be evaluated with respect to each attribute value c according to (1) to calculate a token-attribute score $tf_c(t,d)$ for the token t and attribute value c.

$$tf_c(t,d) = \frac{freq_c(t,d)}{1 + b_c\left(\frac{L_{dc}}{L_c} - 1\right)} \quad (1)$$

where $freq_c(t,d)$ is a frequency of occurrence of token t in attribute value c of document d, $b_c$ is an arbitrary constant, $L_c$ is an average length of the attribute c for all product records (or a major portion of the product records) and $L_{dc}$ is the length of the attribute c of document d. In some embodiments, $L_c$ and $L_{dc}$ are both measured in number of words. $freq_c(t,d)$ may be calculated simply as a number of occurrences of token t in attribute c. However, other measures of usage frequency may also be used.

As is apparent from (1), as $L_{dc}$ increases relative to $L_c$, the value of $$b_c\left(\frac{L_{dc}}{L_c} - 1\right)$$

also increases. In this manner, those attribute values c that are unusually long will be penalized. The value $b_c$ determines the amount of this penalty and may be chosen according to human judgment based on experimentation.

The method 500 further includes, for each token t, summing 506 the corresponding scaled values based on the match frequencies. For example, the token-attribute scores $tf_c(t,d)$ for a token may be summed according to (2) to calculate a token score tf (t,d) for token t with respect to a product record d.

$$tf(t,d) = \Sigma_{c=1}^{N} w_c tf_c(t,d) \quad (2)$$

Where $w_c$ are weighting values associated with each attribute c and N is the number of attributes c of the document d. The values of $w_c$ may be manually specified according to human input or may be determined using logistic regression using validated training data. Training data for determining the values $w_c$ may include entries including such data as a query, product records relevant to the query, and a human specified indicators indicating the relevance of the product records to the query. Logistic regression may then be used to determine values of $w_c$ that yield token scores that are relatively large for product records indicated as relevant to the query and relatively low for product records not indicated as relevant to the query.

The method 500 may include scaling 508 the token scores determined at step 506 and summing 510 the called token scores. As noted above, the scaling of the token scores may be according to a non-linear function and may be such that the token scores as scaled approach a saturation value with increasing magnitude.

For example, a final score Score(q,d) for a document d may be calculated using the token scores tf(t,d) for tokens found in the document d using (3):

$$\text{Score}(q,d) = \sum_{t=1}^{M} \frac{tf(t,d)}{K + tf(t,d)} IDF(t) \quad (3)$$

where M is the number of tokens for which at least one instance is found in document d, K is an arbitrary constant, and IDF is the inverse document frequency score for token t, such as calculated according to (4):

$$IDF(t) = \log(1 + (N - df + 0.5)/(df + 0.5)), \quad (4)$$

where N is a total number of documents in a corpus and df is the number of these documents in which the token t appears. The documents on which IDF(t) is based may include the product records 114 or some other corpus of documents.

As is apparent from (3), as the value of tf (t,d) becomes much larger than K, the value of Score(q,d) approaches IDF(t). Accordingly, IDF(t) is the saturation value. The value of K is arbitrary and may be chosen according to human judgment based on experimentation in order to limit the influence of tokens having a large number of instances in a document. As known in the art the value of IDF(t) reduces the influence of commonly used words. In some embodiments, multiplication by IDF(t) is omitted such that the saturation value of (4) is simply one.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for attribute-based searching of product records in a product database, the method comprising:
receiving, by a computer system, a query;
identifying, by the computer system, tokens in the query;
adding, to the tokens in the query, other tokens that are not found in the query, wherein the other tokens are conceptually related to words or phrases of the query;
identifying, by the computer system, in the product database, a plurality of product records that include at least one token t of the tokens in the query, including using a string-edit distance similarity metric to match at least one of the tokens in the query to a dissimilar word in a product record of the plurality of product records based on similarity according to the string-edit distance similarity metric;
for each product record d of the plurality of product records, including at least one token t of the tokens in the query, calculating, by the computer system, token-attribute scores $tf_c(t,d)$ for each attribute value c of the each product record d, the token-attribute scores $tf_c(t,d)$ decreasing with length of the attribute value c, wherein $tf_c(t,d)$ is calculated according to an equation $tf_c(t,d) = freq_c(t,d)/(1+b_c(L_{dc}/L_c-1))$, where $freq_c(t,d)$ is a frequency of occurrence of token t in attribute value c of product record d, $L_c$ is an average length for values of attribute value c in a corpus, and $L_{dc}$ is the length of the attribute value c in product record d;
assigning, by the computer system, a product record score to each product record d of the plurality of product records based on a summation of the token-attribute scores $tf_c(t,d)$ for the each product record d;
ranking, by the computer system, the plurality of product records according to the product record scores, resulting in ranked product records; and
returning, by the computer system, at least a portion of the ranked product records as a response to the query.

2. The method of claim 1 wherein assigning, by the computer system, the product record score to each product record d of the plurality of product records based on the summation of the token-attribute scores $tf_c(t,d)$ further comprises: calculating a token score tf(t,d) for each token t identified in the each product record d as a summation of the token-attribute scores $tf_c(t,d)$ for the each token t.

3. The method of claim 2 wherein assigning, by the computer system, the product record score to each product record d of the plurality of product records based on the summation of the token-attribute scores $tf_c(t,d)$ further comprises: summing the token scores tf(t,d) for each token t found in the each product record d.

4. The method of claim 3 wherein assigning, by the computer system, the product record score to each product record d of the plurality of product records based on the summation of the token-attribute scores $tf_c(t,d)$ further comprises:
generating scaled token scores based on the token scores tf(t,d) for each token t found in the each product record d; and
summing the scaled token scores to generate the product record score.

5. The method of claim 3 wherein generating scaled token scores based on the token scores tf(t,d) for each token t found in the each product record d comprises scaling the token scores tf(t,d) in a non-linear manner.

6. The method of claim 3 wherein generating scaled token scores based on the token scores tf(t,d) for each token t found in the each product record d comprises scaling the token scores tf(t,d) such that the scaled token scores approach a saturation value with increasing magnitude of the token scores tf(t,d).

7. The method of claim 1 wherein assigning, by the computer system, the product record score to each product record d of the plurality of product records based on the summation of the token-attribute scores $tf_c(t,d)$ further comprises:
calculating a token score tf(t,d) for each token t identified in the each product record as $$tf(t,d) = \sum_{c=1}^{N} w_c tf_c(t,d)$$

where $w_c$ is a weighting factor for each attribute value c and N is a number of attribute values c in the each product record d.

8. The method of claim 1 wherein the act of identifying, by the computer system, tokens in the query, comprises referencing a dictionary using a matching technique.

9. The method of claim 8 wherein the matching technique is a greedy matching technique.

10. The method of claim 8 wherein the matching technique is a non-greedy matching technique.

11. The method of claim 8 wherein a word is included in the tokens in the query that is a longest string in the query that matches a string in the dictionary.

12. A system for attribute-based searching product records, the system comprising one or more processors and one or more memory devices operably coupled to the one or more processors, the memory devices storing executable and operational data effective to cause the one or more processors to:
receive a query;
identify tokens in the query, including referencing a dictionary using a matching technique;
identify a plurality of product records including at least one token t of the tokens in the query;
for each product record d of the plurality of product records including at least one token t of the tokens in the query, calculate token-attribute scores $tf_c(t,d)$ for each attribute value c of the each product record d, the token-attribute scores $tf_c(t,d)$ decreasing with length of the attribute value c, wherein $tf_c(t,d) = freq_c(t,d)/(1+b_c(L_{dc}/L_{c+}-1))$, where $freq_c(t,d)$ is a frequency of occurrence of token t in attribute value c of product record d, $L_c$ is an average length for values of attribute value c in a corpus, and $L_{dc}$ is the length of the attribute value c in product record d;

assign a product record score to each product record d of the plurality of product records based on a summation of the token-attribute scores $tf_c(t,d)$ for the each product record d;

rank the plurality of product records according to the product record scores resulting in a ranked plurality of product records; and return at least a portion of the ranked plurality of product records as a response to the query.

13. The system of claim 12 wherein the executable and operational data are further effective to cause the one or more processors to assign the product record score to each product record d of the plurality of product records based on the summation of the token-attribute scores $tf_c(t,d)$ by: calculating a token score $tf(t,d)$ for each token t identified in the each product record d as a summation of the token-attribute scores $tf_c(t,d)$ for the each token t.

14. The system of claim 13 wherein the executable and operational data are further effective to cause the one or more processors to assign the product record score to each product record d of the plurality of product records based on the summation of the token-attribute scores $tf_c(t,d)$ by: summing the token scores $tf(t,d)$ for each token t found in the each product record d.

15. The system of claim 14 wherein the executable and operational data are further effective to cause the one or more processors to assign the product record score to each product record d of the plurality of product records based on a summation of the token-attribute scores $tf_c(t,d)$ by:

generating scaled token scores based on the token scores $tf(t,d)$ for each token t found in the each product record d; and summing the scaled token scores to generate the product record score.

16. The system of claim 14 wherein the executable and operational data are further effective to cause the one or more processors to generate scaled token scores based on the token scores $tf(t,d)$ for each token t found in the each product record d by scaling the token scores $tf(t,d)$ in a non-linear manner.

17. The system of claim 14 wherein generating scaled token scores based on the token scores $tf(t,d)$ for each token t found in the each product record d comprises scaling the token scores $tf(t,d)$ such that the scaled token scores approach a saturation value with increasing magnitude of the token scores $tf(t,d)$.

18. The system of claim 12 wherein the executable and operational data are further effective to cause the one or more processors to assign the product record score to each product record d of the plurality of product records based on the summation of the token-attribute scores $tf_c(t,d)$ by:

calculating a token score $tf(t,d)$ for each token t identified in the each product record d as $$tf(t, d) = \sum_{c=1}^{N} w_c tf_c(t, d)$$

where $w_e$ is a weighting factor for each attribute value c and N is a number of attribute values c in the each product record d.

19. The system of claim 12 wherein the matching technique is a greedy matching technique.

20. The system of claim 12 wherein the matching technique is a non-greedy matching technique.

21. The system of claim 12 wherein a word is included in the tokens in the query that is a longest string in the query that matches a string in the dictionary.

22. The system of claim 12 further comprising adding, to the tokens in the query, other tokens that are not found in the query, wherein the other tokens are conceptually related to words or phrases of the query.

* * * * *